(12) United States Patent
Henderson et al.

(10) Patent No.: US 8,783,757 B2
(45) Date of Patent: Jul. 22, 2014

(54) DEVICES AND METHODS FOR REDUCING VEHICLE DRAG

(71) Applicant: SmartTruck Systems, LLC, Greenville, SC (US)

(72) Inventors: Michael Lorenzo Henderson, Piedmont, SC (US); Stephen Alfred Wulff, Simpsonville, SC (US)

(73) Assignee: SmartTruck Systems, LLC, Greenville, SC (US)

( * ) Notice: Subject to any disclaimer, the term of this patent is extended or adjusted under 35 U.S.C. 154(b) by 0 days.

(21) Appl. No.: 13/687,710

(22) Filed: Nov. 28, 2012

(65) Prior Publication Data

US 2013/0113235 A1    May 9, 2013

Related U.S. Application Data

(63) Continuation of application No. 12/775,095, filed on May 6, 2010, now Pat. No. 8,342,595.

(51) Int. Cl.
*B62D 35/00* (2006.01)

(52) U.S. Cl.
USPC ........................................ 296/180.4; 293/117

(58) Field of Classification Search
USPC ..................... 296/180.1, 180.4, 180.5, 181.5; 293/117
See application file for complete search history.

(56) References Cited

U.S. PATENT DOCUMENTS

| | | |
|---|---|---|
| 3,960,402 A | 6/1976 | Keck |
| 4,386,801 A | 6/1983 | Chapman et al. |
| 4,421,354 A | 12/1983 | Lemaster |
| 4,457,550 A | 7/1984 | Gielow et al. |
| 5,498,059 A | 3/1996 | Switlik |
| 6,257,654 B1 | 7/2001 | Boivin et al. |
| 7,625,034 B1 | 12/2009 | Fitzgerald |
| 7,641,262 B2 | 1/2010 | Nusbaum |
| 7,789,453 B2 | 9/2010 | Roush et al. |
| 7,806,464 B2 | 10/2010 | Cardolle |

(Continued)

FOREIGN PATENT DOCUMENTS

| | | |
|---|---|---|
| GB | 2051691 A | 1/1981 |
| GB | 2228456 A | 8/1990 |
| JP | 7052793 | 12/1995 |
| KR | 20-0182899 | 6/2000 |
| WO | WO 2006/080873 | 8/2006 |
| WO | WO 2008/125863 | 10/2008 |

OTHER PUBLICATIONS

International Search Report from PCT/2011/035124 (BMIC-5-PCT)—10 pages.
International Search Report from PCT/US2011/038682 (BMIC-5-CIP-PCT)—3 pages.

(Continued)

*Primary Examiner* — Jason S Morrow
(74) *Attorney, Agent, or Firm* — Dority & Manning, PA

(57) ABSTRACT

An apparatus for reducing the drag of a trailer is provided. The apparatus can further include a pair of fairings configured to be positioned on opposite sides of a trailer in front of wheels on the bottom of a trailer, a pair of fairings configured to be positioned on opposite sides of a trailer behind the wheels on the bottom of a trailer, with both pairs of fairings placed and shaped to direct the air smoothly around the wheels and tires and through the center of the trailer. The apparatus can also include a ramp in front of the suspension components, aerodynamically shaped wings on the axles, and a rear diffuser, such components configured to direct air smoothly between the trailer suspension and the ground. The directed high energy air from the apparatus results in a reduced trailer base drag.

14 Claims, 7 Drawing Sheets

(56) References Cited

U.S. PATENT DOCUMENTS

| | | | |
|---|---|---|---|
| 2006/0252361 A1 | 11/2006 | Henderson, II | |
| 2007/0120397 A1 | 5/2007 | Layfield et al. | |
| 2008/0093886 A1* | 4/2008 | Nusbaum | 296/180.1 |
| 2009/0146453 A1 | 6/2009 | Ortega et al. | |
| 2010/0066123 A1 | 3/2010 | Ortega et al. | |
| 2011/0095564 A1* | 4/2011 | Chen | 296/180.4 |
| 2011/0272963 A1* | 11/2011 | Henderon et al. | 296/180.4 |
| 2011/0272964 A1* | 11/2011 | Henderson et al. | 296/180.4 |
| 2011/0272965 A1* | 11/2011 | Henderson et al. | 296/180.4 |
| 2013/0062908 A1* | 3/2013 | Henderson et al. | 296/180.4 |

OTHER PUBLICATIONS

International Search Report from PCT/US2011/055673 (BMIC-5-CIP2-PCT)—9 pages.

NRC Wind Tunnel Test SAE Paper.

TMA (Truck Manufacturers Association), Test, Evaluation and Demonstration of Practical Devices/Systems to Reduce Aerodynamic Drag of Tractor/Semitrailer Combination Unit Trucks, Prepared for by the National Energy Technology Laboratory (NTEL) under contract No. DE-FC26-04NT42117, Apr. 2007, Morgantown, WV, pp. 64-77.

* cited by examiner

DEVICES AND METHODS FOR REDUCING VEHICLE DRAG

BACKGROUND

An ongoing effort to reduce drag in vehicular structures is of great importance as fuel economy becomes an increasingly large consideration in vehicular design. As the drag of a vehicle increases, the amount of fuel needed to move the vehicle also increases due to the greater energy required to overcome the drag. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

For instance, heavy-duty vehicles such as tractor-trailers (also known as semi tractors, tractors, class 8 long haul trucks, transfer trucks, 18-wheelers, semis, etc.) have a tall and wide box-shaped profile that creates a significant amount of drag compared to smaller vehicles on the road. For instance, Table I lists common drag coefficients of road vehicles.

TABLE I

| Type of Vehicle | Drag Coefficient (Cd) |
|---|---|
| Low Drag Production Car | .26 |
| Typical Sedan | .3-.35 |
| Sport Utility Vehicle | .4-.5 |
| Pick-up Truck | .4-.5 |
| Conventional Class 8 long haul tractor trailers | .59-.63 |

In the U.S., vehicles commonly used to move freight typically include a tractor which powers the vehicle and a trailer which contains the freight. Tractors usually have 3 axles, the front, or "steer", axle having two wheels, and two rear, or "drive", axles each having a pair of wheels on each side. The most common configuration of this type of tractor has 10 wheels; however, in some cases the traditional pairs of wheels and tires are replaced by single wides; also known as "super singles", or wide-base singles. Single wide tires and wheels reduce the weight of the semi-trailer and in some cases reduce the rolling resistance of the vehicle. Tractors equipped with single wides only have six tires and wheels. Smaller tractors, having a single drive axle (for 6 wheels in total) are often used to pull shorter trailers in tight urban environments. The tires, wheels, axles, drive shaft, differentials, and other wheel components also create drag.

Cargo trailers have a similarly tall and wide box-shaped profile that creates drag because the enclosed cargo space of a trailer is often rectangular in shape. The most common type of cargo trailer in the U.S. is a dry box van that is 53 feet long. Most common cargo trailers typically have two "tandem" axles at the rear, each of which has a pair of wheels for 8 wheels on the trailer. Tires and wheels on trailers can also be replaced with single wides, reducing the total number of tires and wheels on the trailer from 8 to 4. Again, the tires, wheels, axles, and other wheel components create drag. A cargo trailer also typically includes landing gear, which includes legs that the trailer rests upon when detached from a tractor. The landing gear can also create drag.

Certain devices are known in the art, such as trailer side-skirts, fairings, trailer end caps, boat tails, and the like, which attempt to address certain areas of drag on a vehicle. However, many of these devices have significant limitations in their ability to reduce drag or their ability to be easily integrated into fleet operations. As a result, a comprehensive solution for improving drag on a vehicle is still needed.

Thus, a need exists for devices that are designed to provide drag reduction for a vehicle trailer. Methods relating to the utilization of such devices would also be beneficial. Retrofit kits for incorporating such devices into vehicles would also be beneficial.

SUMMARY

In accordance with certain embodiments of the present disclosure, a vehicle trailer is provided. The trailer includes a roof and a floor separated from each other by a pair of walls that extend along the length of the floor. The roof has a front edge and a rear edge and the walls have a height that extends from the floor to the front edge of the roof, the height being substantially the same along at least a portion of the length of the walls.

The vehicle trailer further comprises an apparatus for reducing the drag of the trailer through reduction in the size of the wake behind the trailer, increasing the pressure in the wake, and reducing the drag of the wheel and suspension components underneath the trailer.

In accordance with certain embodiments of the present disclosure, the apparatus can include an aerodynamic rain gutter component having a front edge and rear edge which is positioned on the roof adjacent to the rear edge of the roof such that the front edge of the rain gutter component contacts the roof and the rear edge of the rain gutter component does not contact the roof. The apparatus can further include a pair of fairings configured to be positioned on opposite sides of a trailer in front of wheels on the bottom of a trailer, a pair of fairings configured to be positioned on opposite sides of a trailer behind the wheels on the bottom of a trailer, with both pairs of fairings placed and shaped to direct the air smoothly around the wheels and tires and through the center of the trailer. The apparatus can also include a ramp in front of the suspension components, aerodynamically shaped wings on the axles, and a rear diffuser, such components configured to direct air smoothly between the trailer suspension and the ground. The directed high energy air from the apparatus results in a reduced trailer base drag.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is generally directed to devices and methods for reducing vehicle drag caused by vehicle trailers. In this regard, the term vehicle can refer to any type of vehicle. In particular, however, the present disclosure specifically contemplates use with heavy trucks, such as tractors and trailers connected thereto. The present disclosure identifies key areas in which modifications to conventional trailers can result in great reductions in vehicle drag, which can translate into improved fuel economy, reduced emissions of carbon dioxide, as well as other improved efficiencies.

As used herein, drag (also referred to as air resistance or fluid resistance) refers to forces that oppose the relative motion of an object through a fluid (a liquid or gas). Drag forces act in a direction opposite to the velocity of the vehicle. Unlike other resistive forces such as dry friction, which is nearly independent of velocity, aerodynamic drag forces are dependent on the square of the velocity. For a solid object moving through a fluid, the drag is the component of the net aerodynamic or hydrodynamic force acting opposite to the direction of the movement. Therefore drag opposes the motion of the object, and in a powered vehicle it is overcome by thrust provided by the engine through the vehicle's drive train.

Figure 1A:
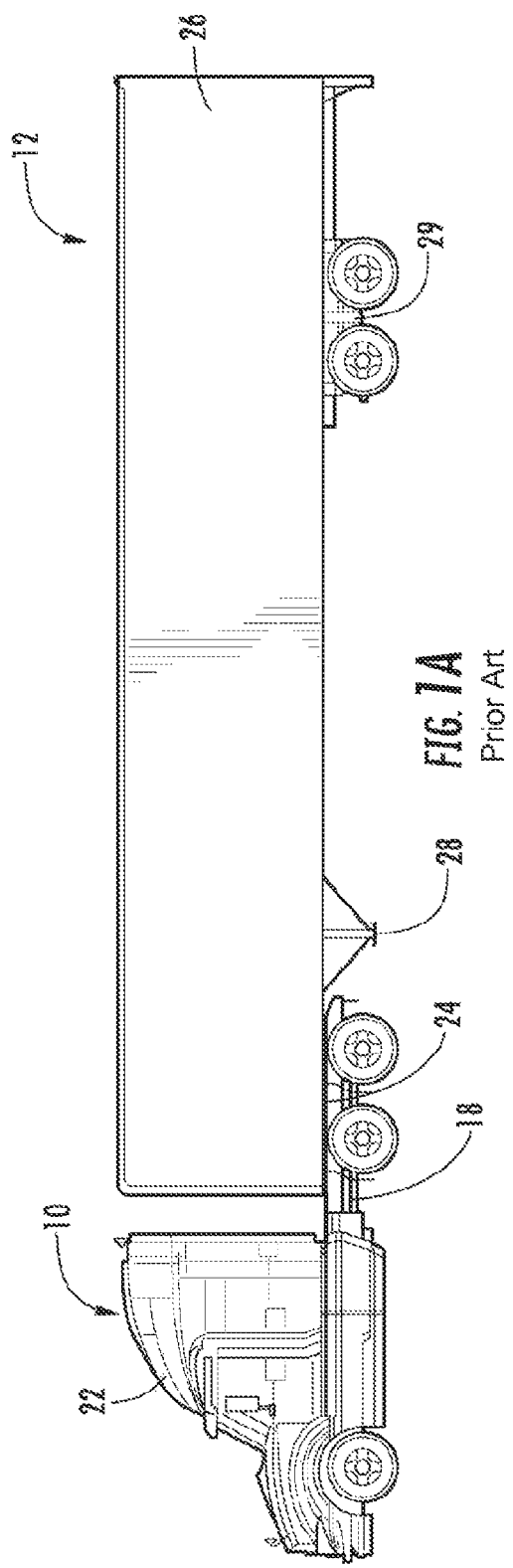
FIGS. 1A and 1B illustrate a conventional tractor-trailer combination.
Figure 1B:
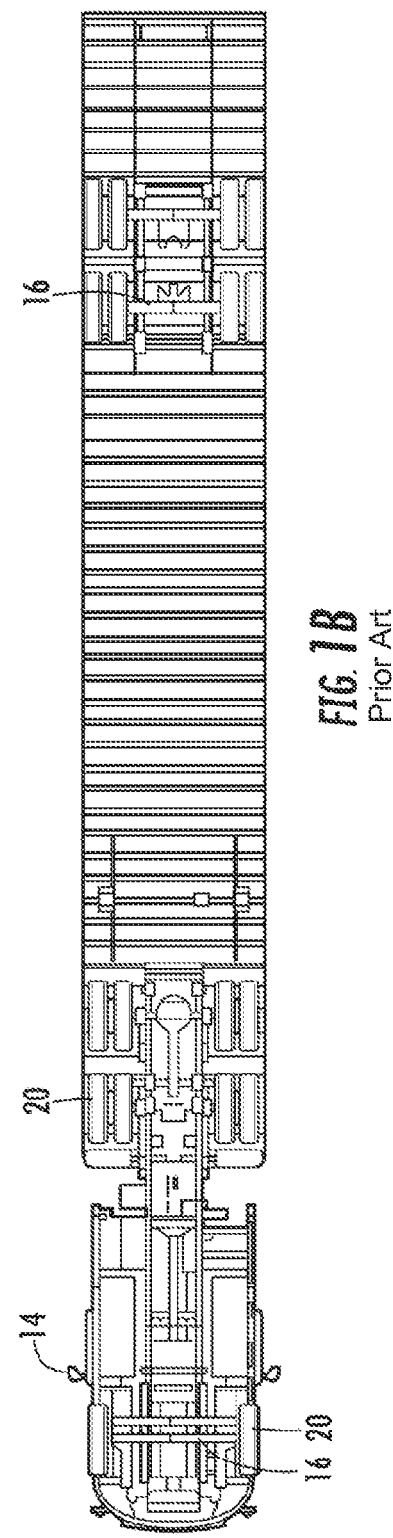

Turning to FIGS. 1A and 1B, a conventional tractor with sleeper compartment 10 with trailer 12 is illustrated. FIG. 1A is a side view of the tractor 10 with trailer 12 and FIG. 1B illustrates the underside. A conventional tractor with sleeper 10 is shown as opposed to cab over engine design, which is also contemplated as a type of vehicle that can be used with the present disclosure. A standard 53 foot long dry box van trailer is illustrated but trailers of any length are contemplated for use with the present disclosure Tractor 10 includes side mirrors 14, axles 16, drive shaft 18, and wheels 20. Tractor also includes air dam 22. Trailer 12 is joined to semi-trailer truck 10 at coupling point 24 typically referred to as the $5^{th}$ wheel. Trailer 12 includes an enclosed cargo space 26. Enclosed cargo space 26 is generally rectangular in shape. Trailer 12 also includes landing gear 28, axles 16, wheels 20, and suspension 29.

Figure 1C:
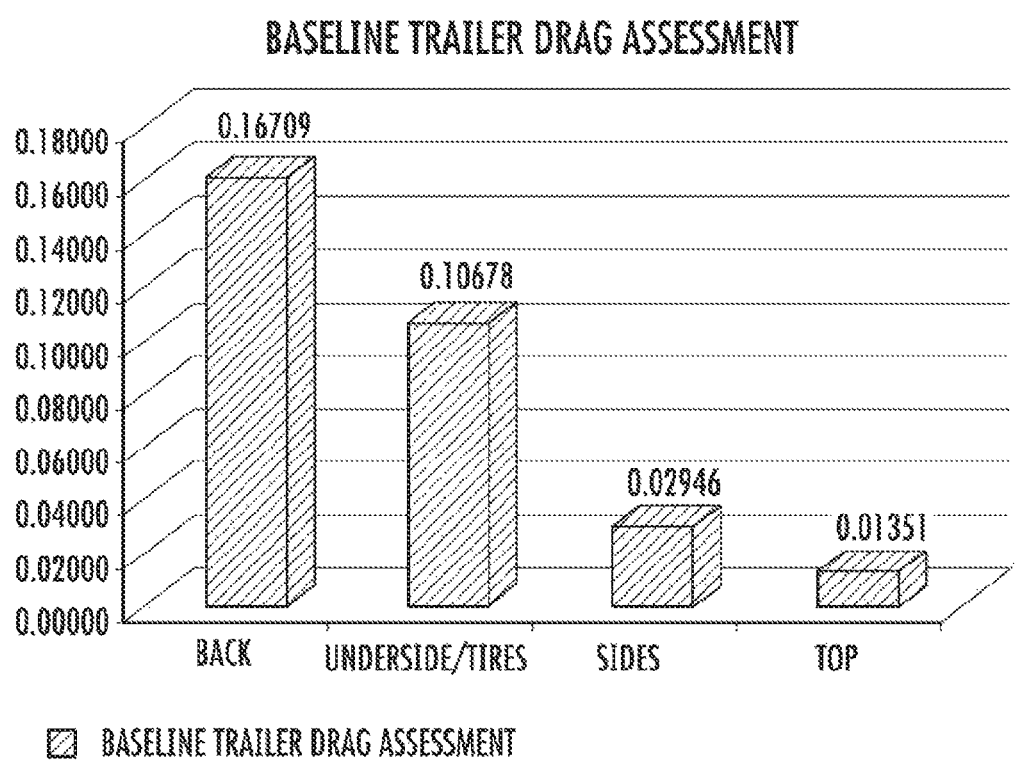
FIG. 1C illustrates a drag assessment of a conventional trailer.
Figure 5A:
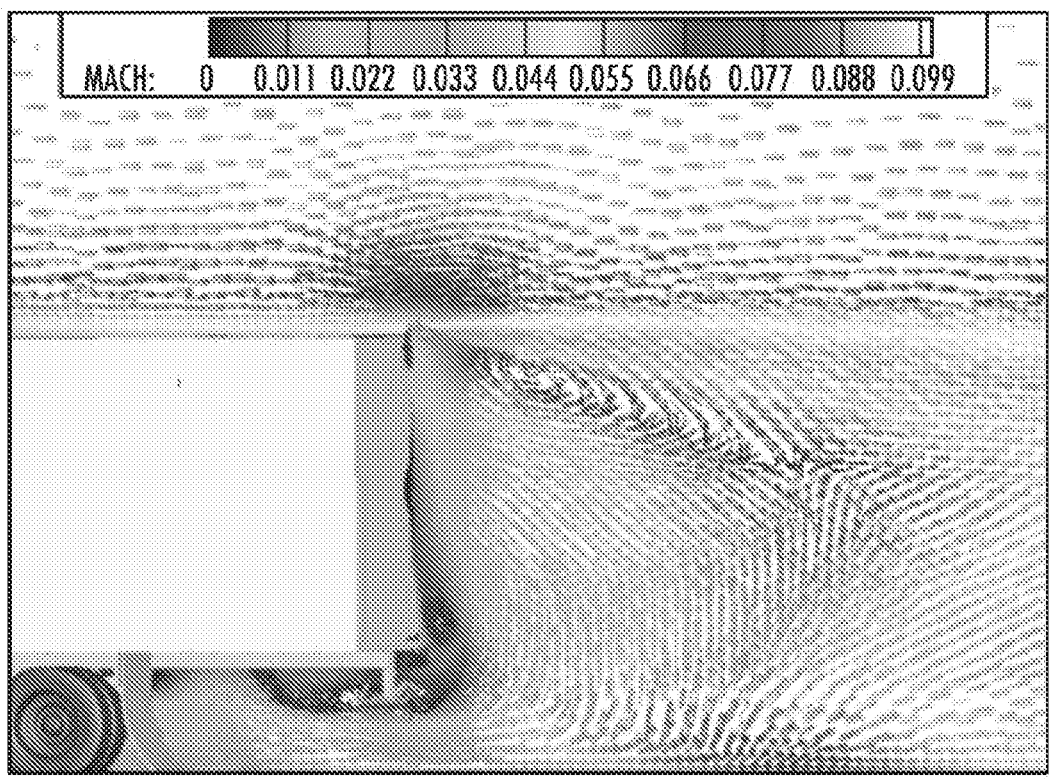
FIG. 5A illustrates a low pressure wake that forms at the rear of a conventional trailer when being pulled at highway speed.

As discussed previously, many of the above-described components create drag during operation of the vehicle. FIG. 1C illustrates a drag assessment of a standard dry van trailer. The trailer back is responsible for creating the largest amount of drag on the vehicle. This is due to a low pressure wake that forms at the rear of the trailer when being pulled at highway speeds. The low pressure wake is formed because air behind the trailer is moving at a very low speed relative to the highway speed of the traveling vehicle. This low pressure wake pulls the vehicle back, creating the significant drag force. FIG. 5A shows an image of a low pressure wake that has formed at the rear of a conventional trailer being pulled at 65 miles per hour. In addition to the trailer back, the trailer underside and tires also create a significant amount of drag as the air collides with the tires, axles, and other fixtures underneath the trailer. The top and side surfaces of the trailer also create drag, although the drag is a relatively small amount compared to the back and underside/tires.

In accordance with the present disclosure, certain improvements are described which can significantly reduce vehicle drag.

Figure 2A:
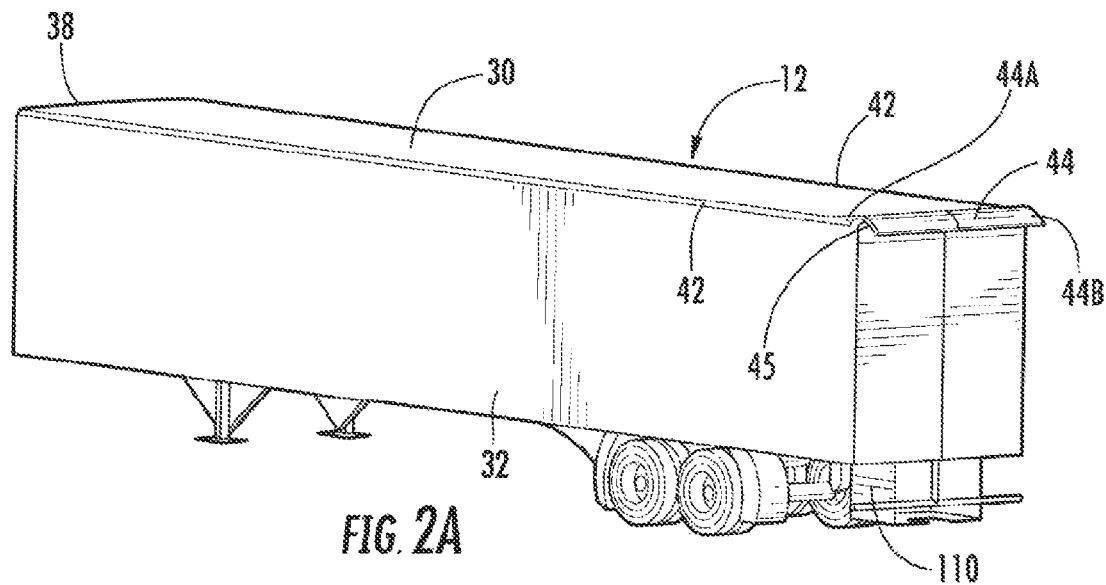
FIGS. 2A and 2B illustrate perspective views of a trailer in accordance with certain embodiments of the present disclosure.
Figure 2B:
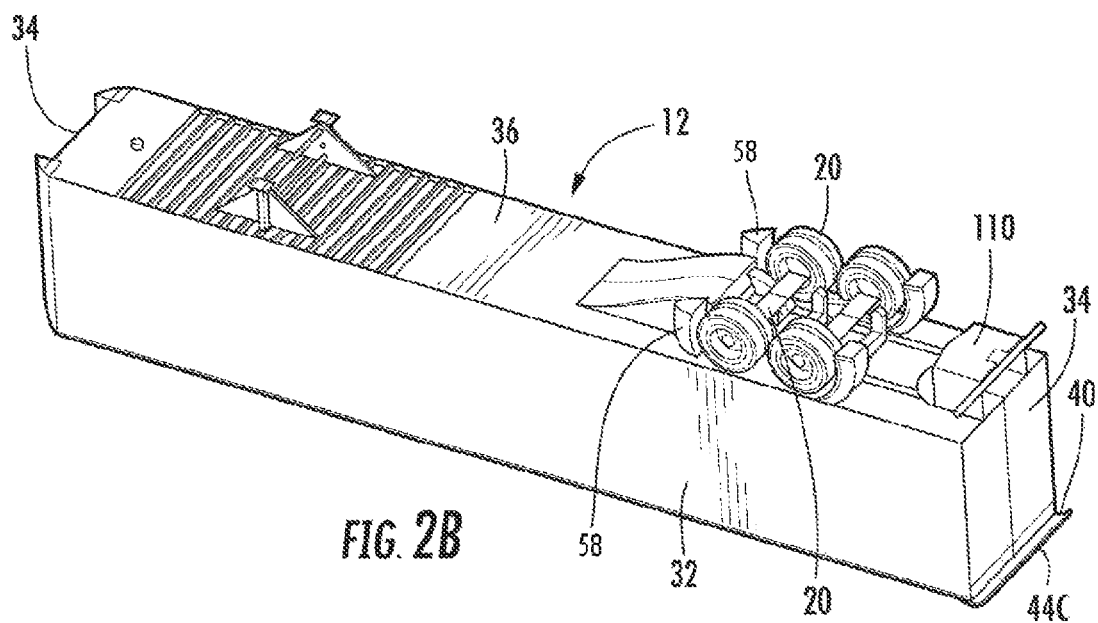

Referring to FIGS. 2A and 2B, perspective views of a trailer in accordance with the present disclosure are illustrated. The illustrated trailer 12 can be joined to a tractor (not shown).

Trailer 12 includes roof 30, two side walls 32, two edge walls 34, and floor 36, which define a space 26 for transport of cargo. Roof 30 includes a front edge 38 (oriented toward the front of the trailer), rear edge 40 (oriented toward the rear of the trailer), and two side edges 42 (extending along the sides of the trailer). Each edge is generally straight. Side walls 32 separate roof 30 from floor 36 and extend along the length of floor 36. As shown in FIG. 2A, side walls 32 have a height that is substantially uniform across the length of each wall 32 except toward the rear edge 40 of trailer, where the height of each wall varies as described further herein. The height for a portion of each wall extends from floor 36 to the height of the front edge 38 of roof 30 again, except toward the rear edge 40 of trailer, where, in certain embodiments, the height can increase and then decrease in conformity to the sloped surface of rain gutter component 44 (described further below) adjacent thereto. Edge walls 34 face the front of the trailer and rear of the trailer. Rear edge wall 34 can provide access into space 26 as will be described in more detail.

In accordance with the present disclosure, aerodynamic rain gutter component 44 is illustrated. Rain gutter component 44 can be positioned adjacent to rear edge 40 of roof 30, over the existing rain gutter on the trailer and be configured so as to have a portion 44A that angles away from floor and a portion 44B that angles back towards floor to points above and below the plane defined by the roof 30. Rain gutter component 44 has a curved, sloping surface. In certain embodiments, side walls of rain gutter component 44 similarly increase in height and decrease in height in conformity with the slope, which results in a portion of each side wall 45 extending above the height of roof 30. When installed, rear edge 44C of rain gutter component has a lower distance to the ground and/or floor 36 than front edge of roof 38 and/or the side walls 45 (if present) adjacent to rear edge except for the portion of each side wall (if present) immediately adjacent to rear edge 44C, such portion (if present) having a substantially identical distance to ground and/or floor 36 with rear edge 44C. For instance, when the rain gutter component is installed, the distance between rear edge 44C and floor 36 can be from about 100 inches to about 105 inches. The length of rain gutter component 44 that is curved can vary. The length of rain gutter component 44 can be from about 16 inches to about 40 inches (by comparison, in certain embodiments, the total length of roof 30 on a standard 53 foot dry van trailer can be about 636 inches). Similarly, width of rain gutter component 44 that is angled can vary. The width of rain gutter component 44 is typically the same width as the trailer and can be from about 100 inches to about 102 inches (by comparison, in certain embodiments, the width of roof 30 can also be from about 100 inches to about 102 inches). The height of aerodynamic rain gutter component 44 from the trailer roof 30 is about 1 inch to about 3 inches. Portion 44A can be angled at an angle from about 5 degrees to about 15 degrees, more particularly at an angle of about 9 degrees to about 11 degrees and portion 44B can be angled at an angle from about 10 degrees to about 20 degrees, more particularly at an angle of about 12 degrees to about 16 degrees. In some embodiments, rain gutter component 44 is substantially a curved panel. The thickness of such a rain gutter component 44 can be from about ⅛ inch to about ¼ inch.

In certain embodiments, additional flap 47 can extend from rear edge 44C and rain gutter component 44 and can articulate between various different angles. For example, when installed, flap 47 continues the curve shown in FIGS. 3A and 3B but can be co-planar with rear edge wall 34 in a first mode, and then pivot into a second mode in which flap 47 continues along the angle of portion 44B in the direction of the ground. It is contemplated that at times, access to space 26 results in flap 47 being adjusted or flexed accordingly. For instance, flap 47 can be split in two haves along the center to correspond with the doors that form rear edge wall 34. In such embodiments, flap 47 would be generally flush with rear edge wall 34 when space 26 is being accessed by opening such doors. To provide needed flexibility, flap 47 can be made of flexible material as would be understood by one of ordinary skill in the art. For instance, rubber or the like can be utilized for flap 47.

Flap 47 can have a length from about 6 inches to about 15 inches and a width from about 100 inches to about 102 inches. Further, flap 47 can have a thickness from about ⅛ inch to about ¼ inch.

Figure 3A:
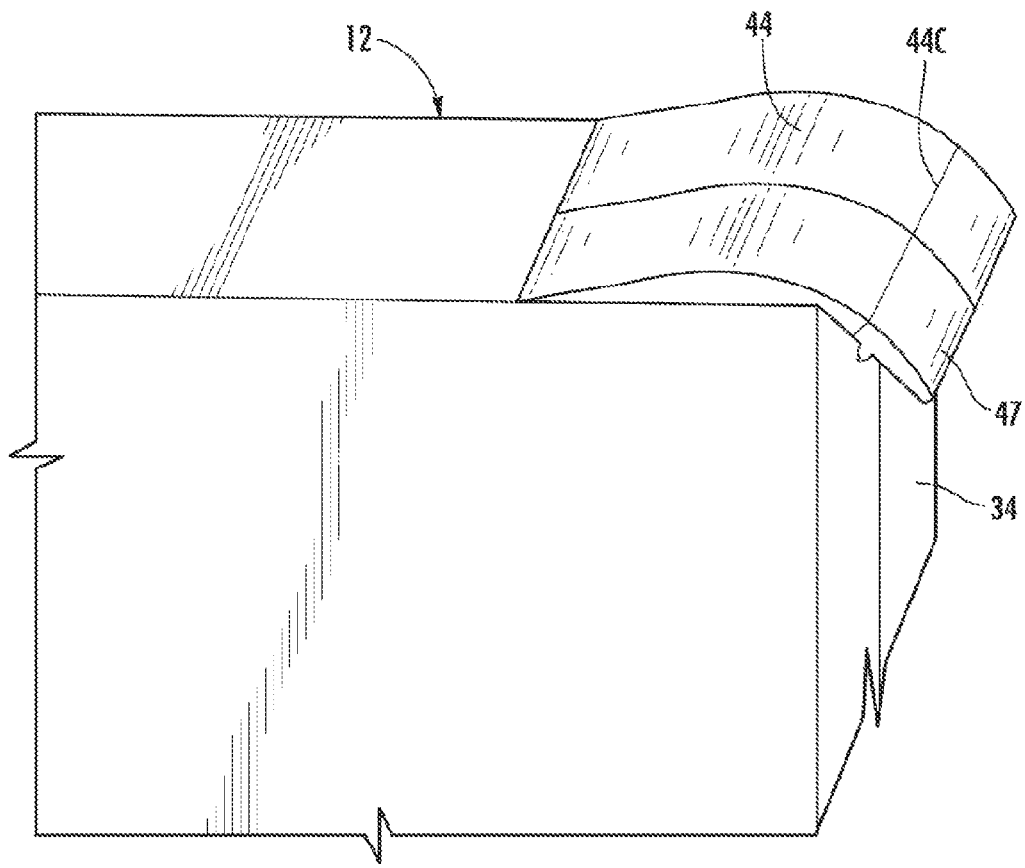
FIG. 3A illustrates a perspective view of a trailer in accordance with certain embodiments of the present disclosure.
Figure 3B:
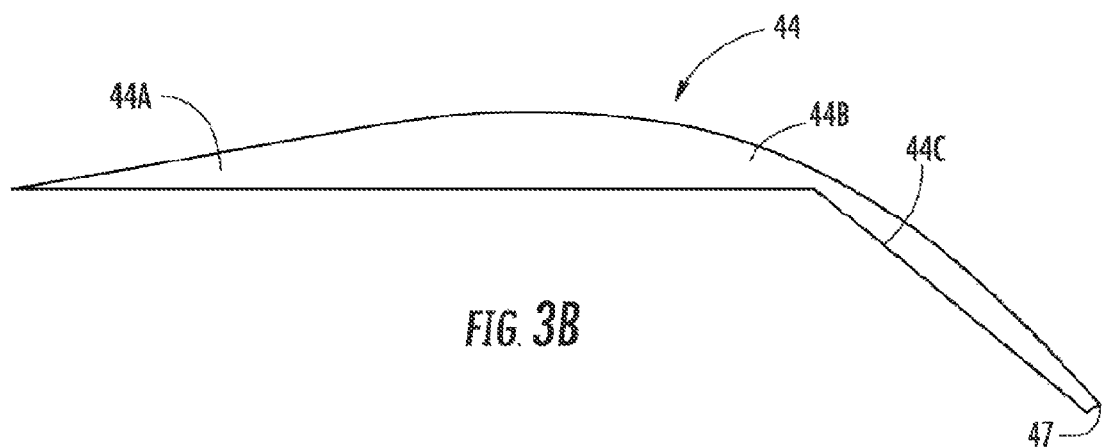
FIG. 3B illustrates a plan view of a rain gutter component in accordance with certain aspects of the present disclosure.

Referring to FIGS. 3A and 3B, a flap 47 in accordance with the present disclosure is illustrated. In such embodiments, flap 47 extends beyond rear edge wall 34 such that the total length of roof 30 and flap 47 is greater than the length of floor 36. For instance, flap 47 can extend from about 4 inches to about 10 inches past rear edge wall 34.

As discussed above, rear edge wall 34 can provide access into space 26 as would be understood by one of ordinary skill in the art. One such embodiment is illustrated in FIG. 2A. For example, if flap 47 is capable of articulating, rear edge wall 34 can include a component that can permit adjustment across certain angles. In addition, rear edge wall 34 can be a conventional sliding door or conventional swing doors as are found on conventional trailers, with the size adjusted to accommodate the rain gutter component 44 and/or flap 47.

In accordance with the present disclosure, certain other aspects are described. For instance, fairings can reduce the drag of the trailer as a result of certain trailer components.

Turning again to FIG. 2B, another pair of fairings is illustrated. The pair of components 58 is positioned in front of wheels 20 and/or wheel assemblies 20. In this regard, a wheel assembly includes any combination of wheels, tires, axles, differentials, and other wheel-related structure, such as struts, shocks, springs, control arms, brake components, or the like. The components are configured to direct fluid flow between the pairs of wheels 20.

Figure 4A:
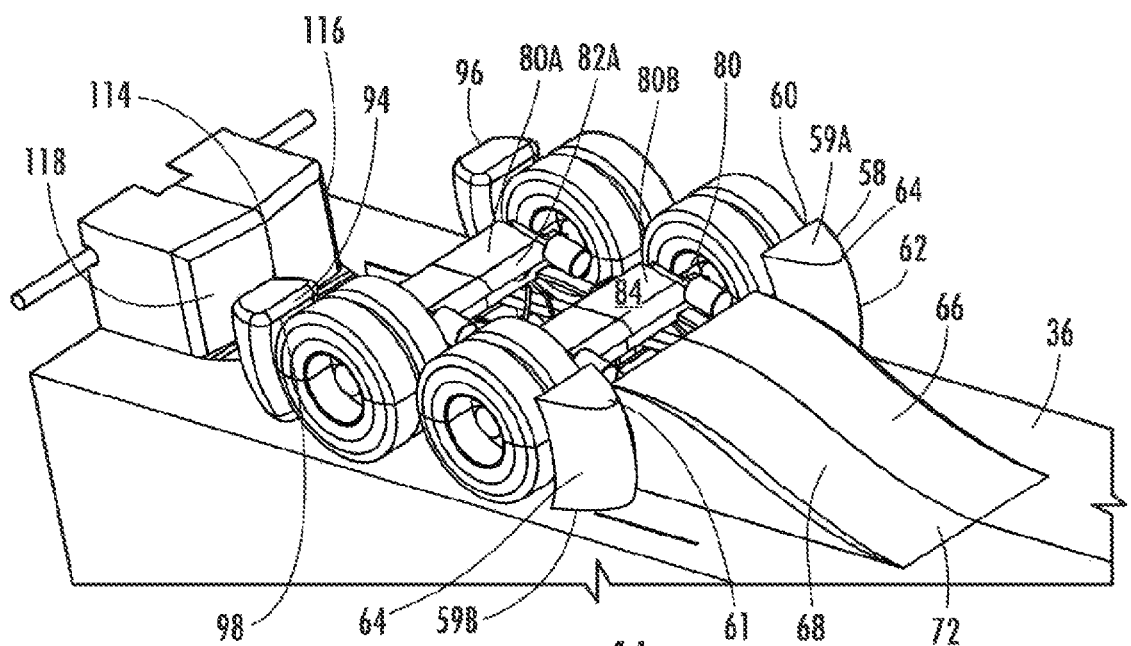
FIGS. 4A and 4B illustrate perspective views of a trailer in accordance with certain embodiments of the present disclosure.
Figure 4B:
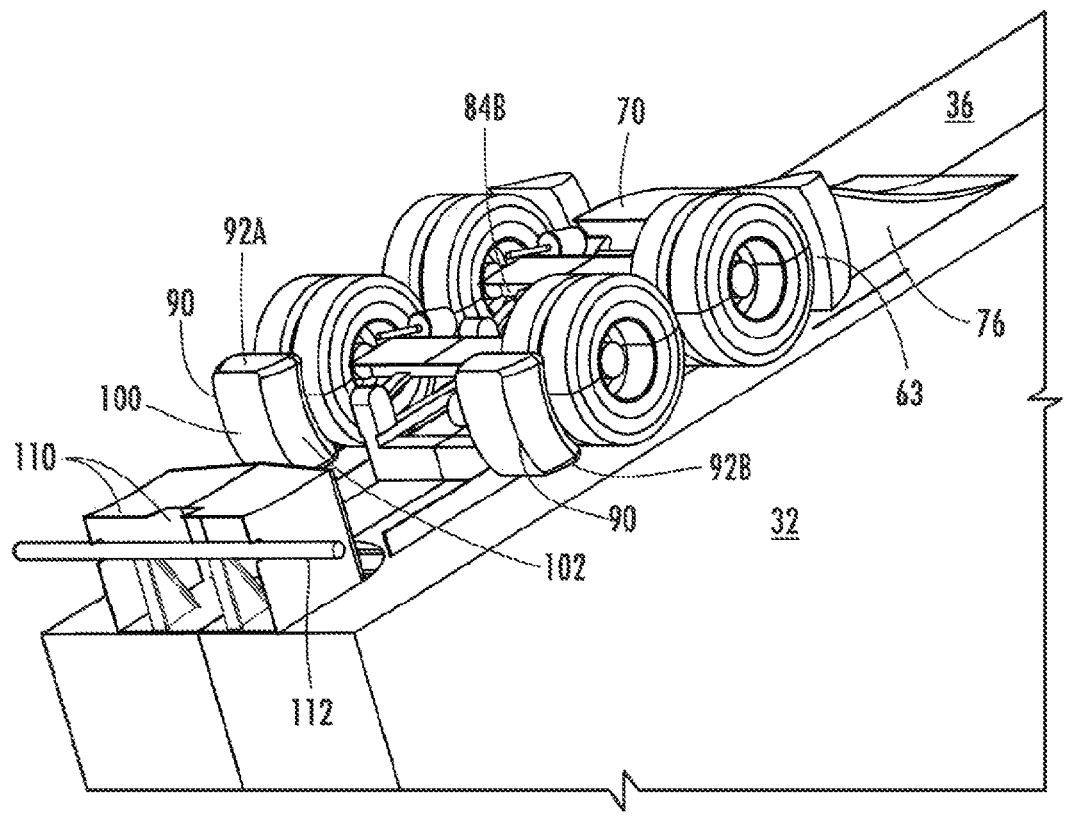

Referring to FIGS. 4A and 4B, each component 58 has a generally parabolic shaped cross-section that is generally parallel to bottom surface 36. For example, each component has a generally flat bottom surface 59A and top surface 59B that are generally parallel to bottom surface 36 with the bottom surface 59A and top surface 59B having a generally straight edge 60 and a generally curved edge 61. The leading portion 62 of component 58 is oriented toward the front of the trailer 12 and the trailing portion 63 is oriented toward the rear of the trailer 12 with the side portions 64 connecting the leading portion 62 and trailing portion 63. The leading portion 62 is curved in conformity with the parabolic shaped cross-section and curved edge 61. In addition, the leading portion 62 is curved as it extends from the bottom surface 59A to the top surface 59B thereof. The trailing portion 63 curves inward towards the front of trailer 12 as it extends from bottom surface 59A to top surface 59B such that the trailing portion 63 is generally complimentary to the curve of one or more adjacent wheels 20.

Each component 58 can be generally identical and positioned, as discussed above, oriented on opposite sides of trailer in front of each pair of wheels 20. Each component 58 can have a length from about 12 inches to about 28 inches. In addition, each component can have a width from about 16 inches to about 27 inches. Each component can have a height from about 19 inches to about 42 inches. For instance, the length, width, and height can be comparable to that of each pair of wheels.

Turning again to FIG. 4A, sloped component 66 can be positioned in front of wheel assemblies 58, with, in certain embodiments, at least a portion positioned in between components 58. The sloped component 20 can have one or more sloped surfaces 68 that slope from bottom surface 36 to a generally flat surface 70. The leading portion 72 of sloped component is generally flush with bottom surface 36 of trailer with the surface 68 of sloped component 66 sloping downward in the direction of the ground. The angle of slope can be from about 15 degrees to about 33 degrees. Side portions 76 of sloped component 66 are generally coplanar with trailer side walls 32.

Sloped component 66 can have a length from about 36 inches to about 114 inches. In addition, sloped component 66 can have a width from about 30 inches to about 68 inches. Sloped component 66 can have a height from about 16 inches to about 40 inches. For instance, the width can be configured so that at least a portion of sloped component 66 fits in between components 58.

Referring again to FIGS. 4A and 4B, sloped component 66 directs airflow underneath one or more axle components 80, which may or may not be integrally formed with sloped component 66. Axle component(s) 80 is configured to be placed over the axle 16 of trailer 12. Axle component(s) 80 can be in the form of one or more axle wings that have a curved front portion 82 and a generally flat body 84. Axle component(s) 80 can have a length from about 12 inches to about 36 inches. In addition, axle component(s) 80 can have a width from about 23 inches to about 68 inches. Axle component(s) 80 can have a thickness from about ⅛ inch to about ½ inch. For instance, the width can be configured so that at least a portion of axle component(s) 80 fits in between wheels 20 of one or both axles 16.

For instance, in certain embodiments, two axle component 80A and 80B can be generally identical and positioned, as discussed above, oriented over the axle of trailer in between each pair of wheels 20 such that sloped portion 82A of the rear axle component 80A is adjacent to the flat body 84B of the forward axle component 80B.

Turning again to FIG. 4B, yet another pair of fairings is illustrated. The pair of rear components 90 is positioned in behind wheels 20 and/or wheel assemblies 20.

Referring to FIGS. 4A and 4B, each rear component 90 has a generally wedge shaped cross-section that is generally parallel to bottom surface 36. For example, each component has a generally flat bottom surface 92A and top surface 92B that are generally parallel to bottom surface 36 with the bottom and top surfaces 92A and 92B having a generally straight edge 94 and a generally curved edge 96. The leading portion 98 of rear component 90 is oriented toward the front of the trailer 12 and the trailing portion 100 is oriented toward the rear of the trailer 12 with the side portions 102 connecting the leading portion 98 and trailing portion 100. The leading portion 98 is curved generally complimentary to the curve of one or more adjacent wheels 20. In addition, the leading portion 98 is curved as it extends from the bottom surface 92A to the top surface 92B thereof. The trailing portion 100 curves outward towards the rear of trailer 12 as it extends from bottom surface 92A to top surface 92B.

Each rear component 90 can be generally identical and positioned, as discussed above, oriented on opposite sides of trailer in behind each pair of wheels 20 such that they are in a mirror-image orientation. Each rear component 90 can have a length from about 12 inches to about 30 inches. In addition, each component can have a width from about 14 inches to about 27 inches. Each component can have a height from about 16 inches to about 36 inches. For instance, the length, width, and height can be comparable to that of each pair of wheels.

As shown in FIGS. 2A and 2B, the present disclosure further includes a diffuser 110. The diffuser 110 can include an integrated bumper 112 or can be placed around an existing bumper (as illustrated in FIG. 4B). Diffuser 110 can have a generally rectangular cross section and can be positioned behind rear wheel assemblies 20 adjacent to the rear end of trailer 12. The diffuser 110 can define a cut-out 111 of any suitable shape or size to enable the trailer to be positioned adjacent to a loading dock and/or attached to a loading dock. Diffuser 110 can include one or more sloped surfaces 118 that slope from the center 114 towards the sides 116. The angle of slope can be from about 0 degrees to about 26 degrees. As seen in FIG. 4B, diffuser 110 can be hollow and the diffuser can have an open face or can have a closed rear face making the diffuser a sealed cube like object.

Diffuser 110 can have a length from about 14 inches to about 98 inches. In addition, diffuser 110 can have a width from about 26 inches to about 102 inches (the full width of the trailer). Diffuser 110 can have a height from about 25 inches to about 42 inches. For instance, as with the other components, the length, width, and height can be comparable to that of each pair of wheels.

In this manner, the devices of the present disclosure reduce drag in a number of ways including:

1. Directly minimizing the drag associated with incoming air flow colliding with the tires, axles, brakes, and other mechanisms under the trailer body. The sloped component 66, front wheel assemblies 20, and axle wings 80A and 80B act as fairings to move the incoming air around the tires, axles, brakes and other mechanisms under the trailer body. Additionally, this collection of components keeps the incoming air from separating as the air flows past the mechanisms underneath the trailer.

Figure 5B:
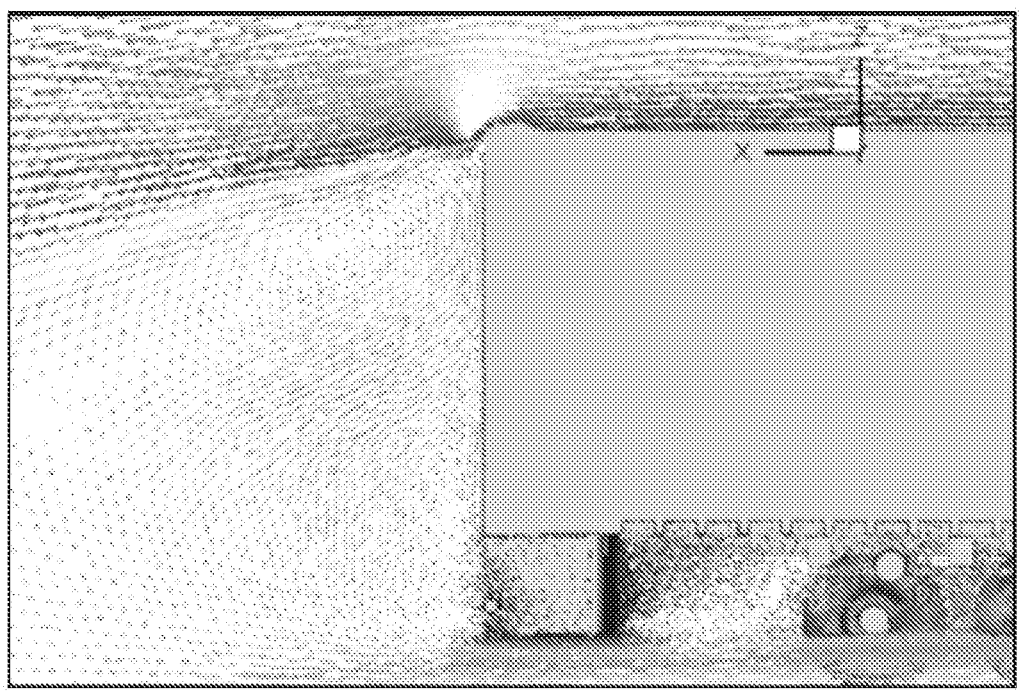
FIG. 5B illustrates reduction in drag by directing the incoming air flow between the trailer wheel assemblies and injecting the high velocity air stream into the trailer wake at the rear of the trailer in accordance with certain embodiments of the present disclosure.

2. Accelerating and compressing the incoming air flow as it travels between the collection of components (66, 58, 80A, 80B, 90, 110), the wheels, and the ground. The components, the wheels, and the ground create a tunnel with a rectangular cross section in which the compressed and accelerated air flows and ultimately is injected below the low pressure wake at the rear of the trailer as shown in FIG. 5B (when compared to a conventional trailer as illustrated in FIG. 5A). At the rear of the trailer, the diffuser 110 deflects the air flow toward the ground at an angle from 3 degrees to 10 degrees as shown in FIG. 5B. Injecting the accelerated and compressed air below the low pressure wake pulls the wake down and reduces its size, the sum of which increases the pressure in the wake, thereby reducing the resulting drag.

Figure 6:
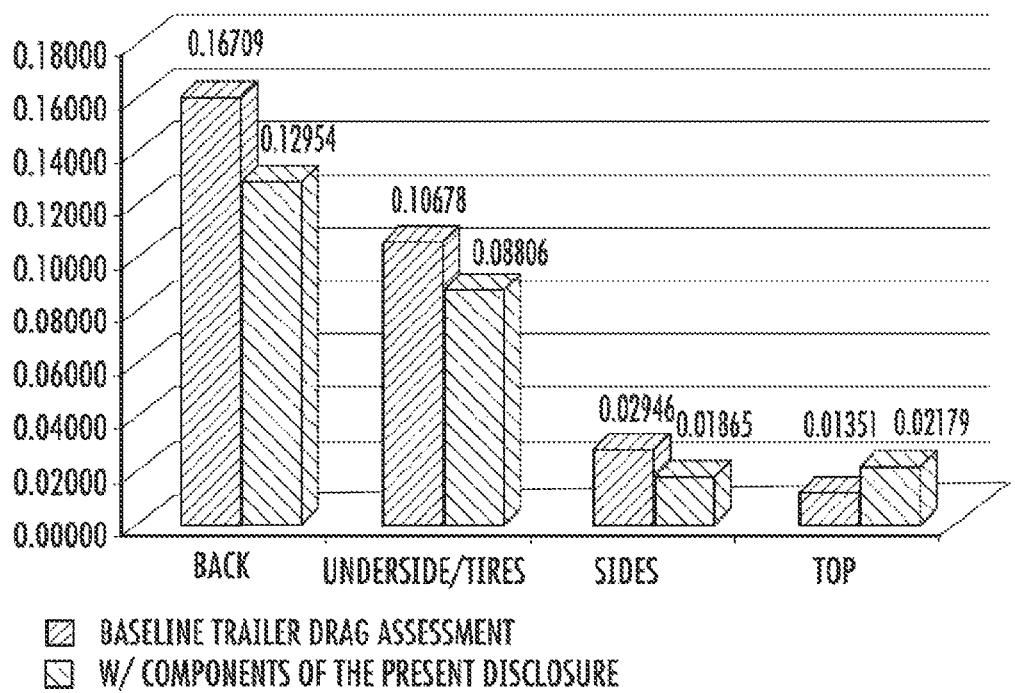
FIG. 6 illustrates the drag contributions from the trailer back, underside, sides, and top and illustrates the reduction in drag from these trailer systems as a result of equipping the trailer with the components of the present disclosure.

3. Directing the attached high velocity incoming air flow from the top of the trailer to the rear of the trailer at a downward angle of approximately 12-15 degrees as shown in FIG. 5B. The aerodynamic rain gutter component 44 and flap 47 keeps the air flow attached and directs the air downward into the low pressure wake. Injecting this high velocity air flow into the low pressure wake reduces the size of the wake and adds energy to it. This increases the pressure in the wake, thereby reducing the resulting drag. FIGS. 5A and 5B compare the flow field at the rear of the trailer without the components of the present disclosure to the flow field of the same trailer that is equipped with the components of the present disclosure. FIG. 6 illustrates the drag contributions from the trailer back, underside, sides, and top and illustrates the reduction in drag from these trailer systems as a result of equipping the trailer with the components of the present disclosure.

It should be understood that while the present discussion and figures describe a dual tire configuration, a single wide tire configuration is also contemplated by the present disclosure. In such embodiments, the present disclosure can be modified as would be understood by one of ordinary skill in the art to achieve the improvements described herein.

All of the above-described elements can be formed from any suitable material as would be known and appreciated in the art. For instance, metals, plastics, or the like can be utilized. Unless otherwise stated, the elements can include a smooth outline to further reduce drag. In addition, it should be appreciated that any suitable mounting hardware including common fasteners (such as nuts, bolts, or the like), latches, hooks, ties, adhesives, magnets, or the like, or any other conventional securing methods as would be known in the art can be utilized in connection with the present disclosure.

It should be understood and appreciated that various combinations of the above described subject matter are contemplated by the present disclosure. In other words, drag improvements can be achieved by using only one of the above-described embodiments, but drag generally improves if more than one component is utilized. In addition, the teachings of the present disclosure can be incorporated into new vehicle and trailer manufacture/sale as well as retrofit kits for upgrading existing vehicles and trailers.

The following examples are meant to illustrate the disclosure described herein and are not intended to limit the scope of this disclosure.

EXAMPLES

Aerodynamic drag associated with trailers, tractor-trailer systems, and components of the present disclosure were all assessed using NASA's Fully Unstructured Navier-Stokes 3D (FUN 3D) Computational Fluid Dynamics (CFD) model described further at http://fun3d.larc.nasa.gov. In addition, the actual fuel savings associated with trailers, tractor-trailer systems, and components of the present disclosure were demonstrated using the industry standard Society of Automotive Engineer's (SAE) long-haul fuel-consumption test J1321 protocol, incorporated by reference herein, in a series of tests at the Continental tire proving grounds in Uvalde, Tex. The long-haul fuel-consumption test provides a standardized test procedure for comparing the in-service fuel consumption of a test vehicle operating under two different conditions relative to the consumption of a control vehicle.

Results of computational fluid dynamics modeling and simulations and SAE J1321 testing are provided in Table IIA. In particular, Table IIA shows that a modern tractor trailer combination equipped with the elements and components described in the present disclosure has 10% less drag than the same tractor trailer without such components. For a tractor trailer operating on the highway at 65 miles per hour, a 10% reduction in drag results in a 5.5% improvement in fuel efficiency.

As illustrated in Table IIB, the SAE J1321 protocol tests at the Continental tire proving grounds in Uvalde, Tex. demonstrated 6.81% improvement in fuel efficiency at 65 mph.

TABLE IIA

|  | Baseline Tractor Trailer | Tractor Trailer Equipped with components of the present disclosure | Percent Improvement |
| --- | --- | --- | --- |
| Cd as calculated by NASA's FUN 3-D Computational Fluid Dynamics Model | .592 | .5328 | 10% |
| Highway fuel efficiency at 65 miles per hour | 6.25 miles per gallon | 6.587 miles per gallon | 5.4% |

TABLE IIB

| Demonstrated * | | | |
| --- | --- | --- | --- |
| Highway fuel efficiency at 65 mph Using SAE J1321 Protocol | 6.252 miles per gallon | 6.678 miles per gallon | 6.81% |

* Test at Continental Tire Proving Grounds in Uvalde, Texas, Apr. 5$^{th}$-10$^{th}$ 2010.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A vehicle trailer, the vehicle trailer comprising a roof and a floor separated from each other by a pair of opposing walls that extend at least partially along the length of the floor, the roof, floor, and walls defining a space accessible by a trailer door, the roof having a front edge and a rear edge, the vehicle trailer further comprising:

a rain gutter component defining a sloped surface extending between a leading edge and a trailing free edge, the rain gutter component being positioned adjacent to the roof such that a portion of the rain gutter component proximate to or including the leading edge contacts the roof and the trailing free edge of the rain gutter component extends beyond the rear edge of the roof, the rain gutter component configured such that a distance of the sloped surface from the roof increases as the rain gutter component extends from the leading edge across a first portion of the roof and then decreases as the rain gutter extends towards the trailing free edge along a second portion of the roof, wherein the rain gutter component is non-movably attached to the trailer such that the portion of the rain gutter component contacting the roof is maintained in a fixed position relative to the roof.

2. The vehicle trailer of claim 1, further comprising a bottom fairing positioned on a bottom portion of the vehicle trailer, the bottom fairing being positioned forward of a rear edge of the vehicle trailer.

3. The vehicle trailer of claim 1, wherein the rain gutter component is inclined at an angle from about 10 degrees to about 20 degrees.

4. The vehicle trailer of claim 1, wherein the rain gutter component is inclined downwardly at an angle from about 12 degrees to about 16 degrees.

5. The vehicle trailer of claim 1, wherein the rain gutter component has a length from about 10 inches to about 40 inches.

6. The vehicle trailer of claim 1, further comprising a diffuser configured to be positioned adjacent to a rear edge of the trailer, wherein the diffuser includes at least one sloped surface configured to direct airflow away from a center line of the trailer.

7. The vehicle trailer of claim 6, wherein the diffuser further comprises a bumper.

8. The vehicle trailer of claim 7, wherein the bumper is integrally formed with the diffuser.

9. A kit for retrofitting an existing vehicle trailer, a roof and a floor separated from each other by a pair of opposing walls that extend at least partially along the length of the floor, the roof, floor, and walls defining a space accessible by a trailer door, the roof having a front edge and a rear edge, the kit comprising:

a rain gutter component defining a sloped surface extending between a leading edge and a trailing free edge, the rain gutter component configured to be positioned adjacent to the roof such that a portion of the rain gutter component proximate to or including the leading edge contacts the roof and the trailing free edge of the rain gutter component extends beyond the rear edge of the roof, the rain gutter component configured such that a distance of the sloped surface from the roof increases as the rain gutter component extends from the leading edge across a first portion of the roof and then decreases as the rain gutter extends towards the trailing free edge along a second portion of the roof, wherein the rain gutter component is configured to be non-movably attached to the trailer such that the portion of the rain gutter component contacting the roof is maintained in a fixed position relative to the roof.

10. The kit for retrofitting an existing vehicle trailer of claim 9, further comprising:

a bottom fairing configured to be positioned on a bottom portion of the vehicle trailer, the bottom fairing being configured to be positioned forward of a rear edge of the vehicle trailer.

11. The kit for retrofitting an existing vehicle trailer of claim 9, further comprising:

a diffuser configured to be positioned adjacent to a rear edge of the trailer, wherein the diffuser includes at least one sloped surface configured to direct airflow away from a center line of the trailer.

12. A method of retrofitting a vehicle trailer, a roof and a floor separated from each other by a pair of opposing walls that extend at least partially along the length of the floor, the roof, floor, and walls defining a space accessible by a trailer door, the roof having a front edge and a rear edge, the method comprising:

installing a rain gutter component on the vehicle trailer, the rain gutter component defining a sloped surface extending between a leading edge and a trailing free edge, the rain gutter component configured to be positioned adjacent to the roof such that a portion of the rain gutter component proximate to or including the leading edge contacts the roof and the trailing free edge of the rain gutter component extends beyond the rear edge of the roof, the rain gutter component configured such that a distance of the sloped surface from the roof increases as the rain gutter component extends from the leading edge across a first portion of the roof and then decreases as the rain gutter extends towards the trailing free edge along a second portion of the roof, wherein the rain gutter component is non-movably attached to the trailer such that the portion of the rain gutter component contacting the roof is maintained in a fixed position relative to the roof.

13. The method of claim 12, further comprising installing a bottom fairing on the vehicle trailer, the bottom fairing positioned on a bottom portion of the vehicle trailer forward of a rear edge of the vehicle trailer.

14. The method of claim 12, further comprising installing a diffuser on the vehicle trailer, the diffuser positioned adjacent to a rear edge of the trailer, wherein the diffuser includes at least one sloped surface configured to direct airflow away from a center line of the trailer.

\* \* \* \* \*